US010860811B2

(12) United States Patent
Shi et al.

(10) Patent No.: US 10,860,811 B2
(45) Date of Patent: Dec. 8, 2020

(54) METHOD AND DEVICE FOR GENERATING REVIEW ARTICLE OF HOT NEWS, AND TERMINAL DEVICE

(71) Applicant: BEIJING BAIDU NETCOM SCIENCE AND TECHNOLOGY CO., LTD., Beijing (CN)

(72) Inventors: Xi Shi, Beijing (CN); Shiliang Diao, Beijing (CN); Sijiao Chen, Beijing (CN); Yu Luo, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 125 days.

(21) Appl. No.: 16/158,925

(22) Filed: Oct. 12, 2018

(65) Prior Publication Data

US 2019/0197122 A1 Jun. 27, 2019

(30) Foreign Application Priority Data

Dec. 27, 2017 (CN) .......................... 2017 1 1444442

(51) Int. Cl.
*G06F 16/953* (2019.01)
*G06F 40/56* (2020.01)
*G06F 40/30* (2020.01)
*G06F 40/49* (2020.01)

(52) U.S. Cl.
CPC ............ *G06F 40/56* (2020.01); *G06F 16/953* (2019.01); *G06F 40/30* (2020.01); *G06F 40/49* (2020.01)

(58) Field of Classification Search
CPC ........... G06F 16/24578; G06F 16/9535; G06F 40/30; G06F 40/56; G06F 40/169; G06F 3/0482; G06F 3/167; G06F 16/243; G06F 16/35; G06F 16/345; G06F 40/205; G06F 40/253; G06F 16/3344; G06F 16/435; G06F 16/24575; G06F 16/29; G06F 16/335; G06F 16/36; G06F 16/285; G06F 16/3329; G06F 40/49; G06F 40/263; G06F 40/44; G06F 16/355; G06F 17/18; G06F 40/42; G06F 16/951; G06F 21/563; G06F 40/131; G06F 40/134; G06F 40/14; G06F 40/221; G06Q 30/0277; G06Q 30/02; G06Q 30/0631; G06Q 30/0282; G06Q 20/12; G06Q 30/0601; G06Q 30/00; G06Q 30/0201;
(Continued)

(56) References Cited

U.S. PATENT DOCUMENTS

| 2011/0125796 | A1* | 5/2011 | Singh | G06Q 10/10 |
| | | | | 707/781 |
| 2013/0204833 | A1* | 8/2013 | Pang | G06F 16/335 |
| | | | | 706/52 |

(Continued)

*Primary Examiner* — Huyen X Vo
(74) *Attorney, Agent, or Firm* — Lathrop GPM LLP

(57) ABSTRACT

The present disclosure provides a method and a device for generating a review article of hot news, and a terminal device. By way of example, the method may include: determining hot news based on reading feedback information and publishing time of respective news in a current webpage library; obtaining review data corresponding to the hot news; selecting a target review set from the review data based on a preset high-quality review model; and generating the review article based on the hot news and the target review set corresponding to the hot news.

17 Claims, 3 Drawing Sheets

(58) Field of Classification Search
CPC ........... G06Q 30/0202; G06Q 30/0251; G06Q 30/0278
See application file for complete search history.

(56) References Cited

U.S. PATENT DOCUMENTS

2015/0121408 A1* 4/2015 Jacoby ............... H04N 21/6582
　　　　　　　　　　　　　　　　　　　725/18
2016/0007083 A1* 1/2016 Gurha ............. H04N 21/44222
　　　　　　　　　　　　　　　　　　　725/13
2016/0188590 A1* 6/2016 Cole ................... G06F 16/9537
　　　　　　　　　　　　　　　　　　　707/747

* cited by examiner

METHOD AND DEVICE FOR GENERATING REVIEW ARTICLE OF HOT NEWS, AND TERMINAL DEVICE

CROSS REFERENCE TO RELATED APPLICATION

This application is based on and claims priority to Chinese Patent Application No. 201711444442.5, filed with the State Intellectual Property Office of P. R. China on Dec. 27, 2017, the entire contents of which are incorporated herein by reference.

TECHNICAL FIELD

The present disclosure relates to the field of computer technology, and more particularly to a method and a device for generating a review article of hot news, and a terminal device.

BACKGROUND

With the rapid development of information technology and the Internet, online news is becoming more and more popular, and has become a major way for people to obtain information in their daily lives. People can access and browse a variety of multimedia news in the form of pictures, text or video through some major web portals or large news websites.

In the billions of pieces of news information that emerges on the Internet every moment, current hot news is usually the focus of attention. Moreover, people often want to know other people's opinions on hot news, thus hot news including high-quality reviews is more popular. Therefore, it is of great significance to generate articles of hot news with high-quality reviews, to facilitate people to understand details of the hot news and public opinions.

At present, review articles of hot news are generally generated by manually collecting hot news and reviews, and then editing to generate corresponding articles, which is labor-intensive, costly, and time consuming.

SUMMARY

Embodiments of the present disclosure provide methods for generating a review article of hot news. In one embodiment, the method may include: determining hot news based on reading feedback information and publishing time of respective news in a current webpage library; obtaining review data corresponding to the hot news; selecting a target review set from the review data based on a preset high-quality review model; and generating the review article based on the hot news and the target review set corresponding to the hot news.

Embodiments of present disclosure provide a terminal device, including: a memory, a processor and computer programs stored in the memory and executable by the processor. The processor is configured to execute the computer programs to perform the method for generating a review article of hot news according to embodiments of the present disclosure.

Embodiments of the present disclosure provide a non-transitory computer readable storage medium, stored with computer programs thereon that, when executed by a processor, cause the method for generating a review article of hot news according to embodiments of the present disclosure to be performed.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
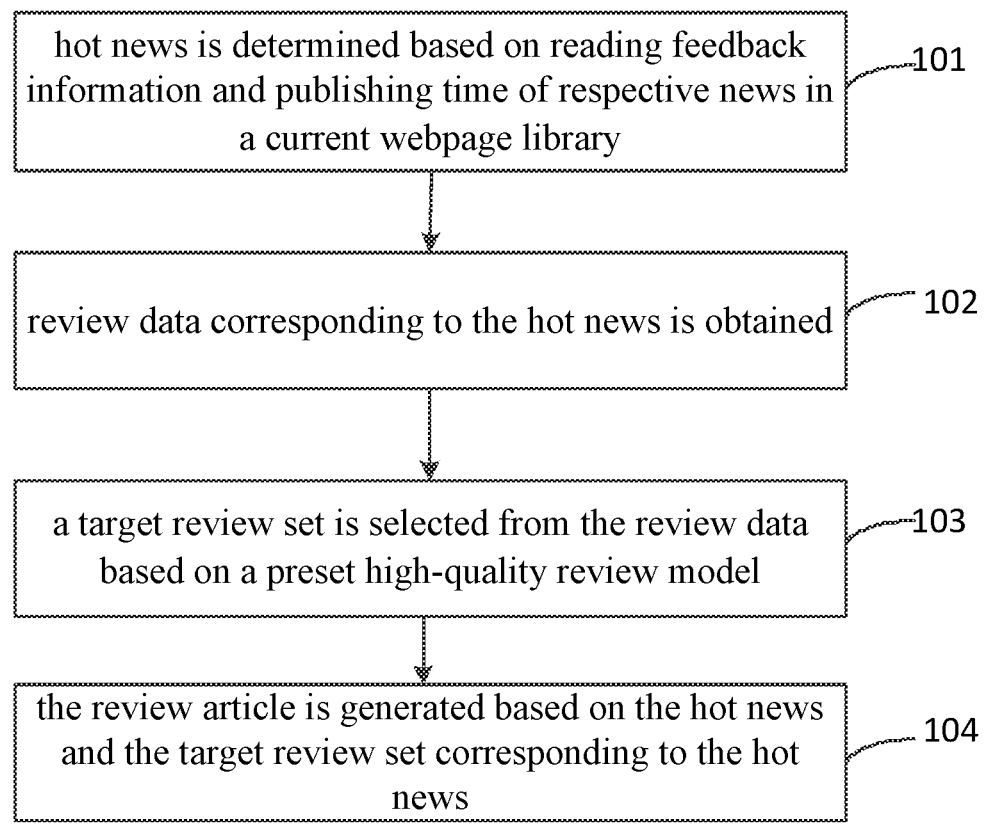
FIG. 1 is a flow chart of a method for generating a review article of hot news according to an embodiment of the present disclosure.

Reference will now be made in detail to exemplary embodiments, examples of which are illustrated in the accompanying drawings, in which the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

In the related art, review articles of hot news are generally generated by manually collecting hot news and reviews, and then editing to generate corresponding articles, which is labor-intensive, costly and time consuming, and user experience is poor. Thus, embodiments of the present disclosure provide a method for generating a review article of hot news.

With the method for generating a review article of hot news according to embodiments of the present disclosure, hot news is determined based on reading feedback information and publishing time of respective news in a current webpage library, and then after review data corresponding to the hot news is obtained, a target review set is selected from the review data based on a preset high-quality review model, and the review article is generated based on the hot news and the target review set corresponding to the hot news. Thus, the review article of the hot news can be automatically generated based on the webpage library, the cost of generating articles is reduced, the speed and timeliness of generating articles is improved, and user experience is improved.

FIG. 1 is a flow chart of a method for generating a review article of hot news according to an embodiment of the present disclosure. As illustrated in FIG. 1, the method may include the following.

At block 101, hot news is determined based on reading feedback information and publishing time of respective news in a current webpage library.

The executive subject of the method for generating a review article of hot news provided by embodiments of the present disclosure may include a device for generating a review article of hot news according to embodiments of the present disclosure, and the device can be configured in any terminal device to generate the review article of hot news.

The webpage library may include webpage data of any website such as large news websites, web portals, or the like.

The reading feedback information may include one or more of the number of clicks of the news, the number of reviews of the news, etc.

In detail, a number threshold of the number of clicks and/or the number of reviews and a time threshold of the publishing time may be preset, and then the news whose number of clicks and/or number of reviews is greater than the preset number threshold and publishing time is after the preset time threshold can be determined as the hot news.

It should be noted that, the current webpage library of embodiments of the present disclosure may be established based on knowledge graph technology. The current webpage library may include a news library, a review library, and encyclopedic knowledge. The news library includes news of the whole network, and the review library includes reviews of the whole network.

Keywords of the news may include the title, the publishing time, the source, the abstract, the main body, the picture, and the like, and keywords of reviews may include nicknames of reviewers, the review time, the review content, the number of likes, the number of replies, and the like.

Web crawler can be used when the webpage library is established, and news from news websites (such as NetEase, Tencent, Sina, Sohu, etc.) can be continuously crawled. Since some news pages may include user reviews, information (including page turning review information) such as the user name, the review content, the review time, the number of likes, the webpage address and the like can be extracted from the news pages, and then the news and the reviews from the same address can be associated.

For news and reviews from different addresses, similarities of the news can be determined based on the keywords of the news, and the news whose matching degrees with the keywords are greater than a threshold (i.e., the similarity is high) can be placed in the same repeating group, and then reviews corresponding to the news in the same repeating group can be aggregated, so as to achieve aggregation of news in the webpage library and aggregation of reviews in the review library. The keywords of the hot news may be words with the highest term frequency-inverse document frequency (TF-IDF) extracted from the title and the main body of the hot news.

Furthermore, in order to enrich the content of the webpage library, knowledge graph technology can be used to associate entities in the news to entities in the encyclopedic knowledge, so as to supplement the news library with information such as pictures using the encyclopedic knowledge.

At block 102, review data corresponding to the hot news is obtained.

The review data may include any form of review data such as text, pictures, videos, and the like.

In detail, the review data corresponding to the hot news may be obtained in the following ways.

In one way, the review data corresponding to the hot news can be obtained based on an address of the hot news.

In detail, since the hot news and the review data corresponding to the hot news may usually appear on the same webpage, the review data corresponding to the hot news can be obtained from the webpage library through the address of the hot news.

In the other way, the review data of other news whose matching degrees with the keywords satisfy a threshold can be obtained based on the keywords of the hot news.

It can be understood that, in addition to the webpage where the hot news is located, other webpages may also include review data of the hot news or similar hot news, and keywords of the same or the similar hot news may usually be the same. Therefore, the review data corresponding to the hot news can be obtained from the webpage library based on the keywords of the hot news.

In detail, a matching threshold may be set in advance, and then the keyword of the hot news can be matched with keywords of respective news in the webpage library, such that review data of other news whose matching degrees with the keywords satisfy the matching threshold can be taken as the review data corresponding to the hot news.

At block 103, a target review set is selected from the review data based on a preset high-quality review model.

The High-quality review refers to a review that is representative, unique and novel.

In detail, a large amount of review data may be annotated in advance to obtain high-quality review data, and then based on original review data and the annotated high-quality review data, and by taking review content and the number of likes as features and using a Bayesian polynomial model, the high-quality review model can be trained. Then, after the review data corresponding to the hot news is obtained, each review can be scored using the trained high-quality review model, and the review whose score is greater than a preset score can define the target review set.

The original review data may include high-quality review data and low-quality review data.

It should be noted that, other models such as neural network may also be used when training the high-quality review model, which is not limited herein.

At block 104, the review article is generated based on the hot news and the target review set corresponding to the hot news.

In detail, after the hot news and the target review set corresponding to the hot news are determined, the review article can be constructed based on a preset review article model.

The review article model is configured to select data from the obtained hot news and the corresponding target review set, and combine them according to a set manner to generate the review article.

In an implementation, the review article may include one or more of an article title, a lead, an abstract, a picture, a review, and the like.

The article title, the lead, the abstract, the picture and the review content of the review article are described below.

Article Title

In detail, the article title may include various forms. For example, the article title may only include the title of the hot news, such as "all the episodes of People's name (a TV serial) are leaked". Alternatively, the article title may include the title of the hot news and the corresponding high-quality reviews, such as "all the episodes of People's name are leaked|Netizens: anti-corruption drama is on the road to corruption". Alternatively, the article title may include the title of the hot news and preset general content, such as "all the episodes of People's name are leaked God-like reviews of Netizens are gripping", or the like.

It should be noted that, the high-quality review in the article title may be the review with the highest score after each review data corresponding to the hot news is scored using the high-quality review model. The number of words in the article title can be set as needed.

Lead

In detail, the lead can be located in different positions of the article. The lead is configured to connect various parts of the review article, to make the article more smooth and fluent.

Abstract

In detail, the abstract is configured to briefly introduce the hot news. The abstract can be generated by an abstract generator, and the abstract is usually located before specific content of the hot news.

Picture

In detail, the picture may be the picture in the webpage where the hot news is located, or may be the picture in the webpage where the hot news whose matching degree with keywords satisfies a threshold is located. In addition, the picture may be displayed behind the abstract, or may be interspersed between the content of the hot news, which is not limited herein.

By setting pictures in the review article, visual fatigue of users caused by a large amount of text can be avoided.

Review Content

In detail, the number of reviews displayed in the review article may be preset, after the review data corresponding to the hot news is scored by using the preset high-quality review model to select the target review set from the review data, the review data in the target review set can be sorted from high to low by scores, such that the preset number of review data can be selected as the review content of the article starting from the review with the highest score.

In an implementation, in order to avoid the single form of the review, the review content may include a short review, a building review and a long review. The building review can be displayed in the review article in the form of picture, and can be obtained by scoring multiple buildings of the same hot news using the high-quality review model, selecting one building with the highest score, and converting data of the building with the highest score into the picture.

It should be noted that, in order to enrich the review content of the review article, in embodiments of the present disclosure, the review data including different opinions may be selected from the target review set to generate the review article. In other words, block 104 may include: determining a user opinion type corresponding to each review in the target review set; selecting target review data corresponding to a review including at least two types of user opinions from the target review set; and generating the review article based on the hot news and the selected target review data.

Accordingly, at block 104, generating the review article may include selecting data from the hot news and the selected target review data based on a preset review article model, to construct the review article.

The user opinion type may be classified based on emotion, such as a positive opinion on the hot news or a negative opinion on the hot news. Alternatively, the user opinion type may also be classified based on other factors, which is not limited herein.

In detail, after the user opinion type corresponding to each review in the target review set is determined, the target review data corresponding to the review including at least two types of user opinions can be selected from the target review set, and the review article can be generated based on the hot news and the selected target review data.

With the method for generating a review article of hot news according to embodiments of the present disclosure, hot news is determined based on reading feedback information and publishing time of respective news in a current webpage library, and then after review data corresponding to the hot news is obtained, a target review set is selected from the review data based on a preset high-quality review model, and the review article is generated based on the hot news and the target review set corresponding to the hot news. Thus, the review article of the hot news can be automatically generated based on the webpage library, the cost of generating articles is reduced, the speed and timeliness of generating articles is improved, and user experience is improved.

Based on the above analysis, after the hot news is determined based on the reading feedback information and the publishing time of respective news in the current webpage library, the review data corresponding to the hot news can be obtained, and then the target review set can be selected from the review data based on the preset high-quality review model, such that the review article can be generated based on the hot news and the target review set corresponding to the hot news. In actual applications, for the same hot news, the hot news may be reported and reprinted by many different websites, thus the hot news determined based on the reading feedback information and the publishing time of respective news in the current webpage library may be duplicated. In the following, the situation will be described and explained with accompanying FIG. 2.

Figure 2:
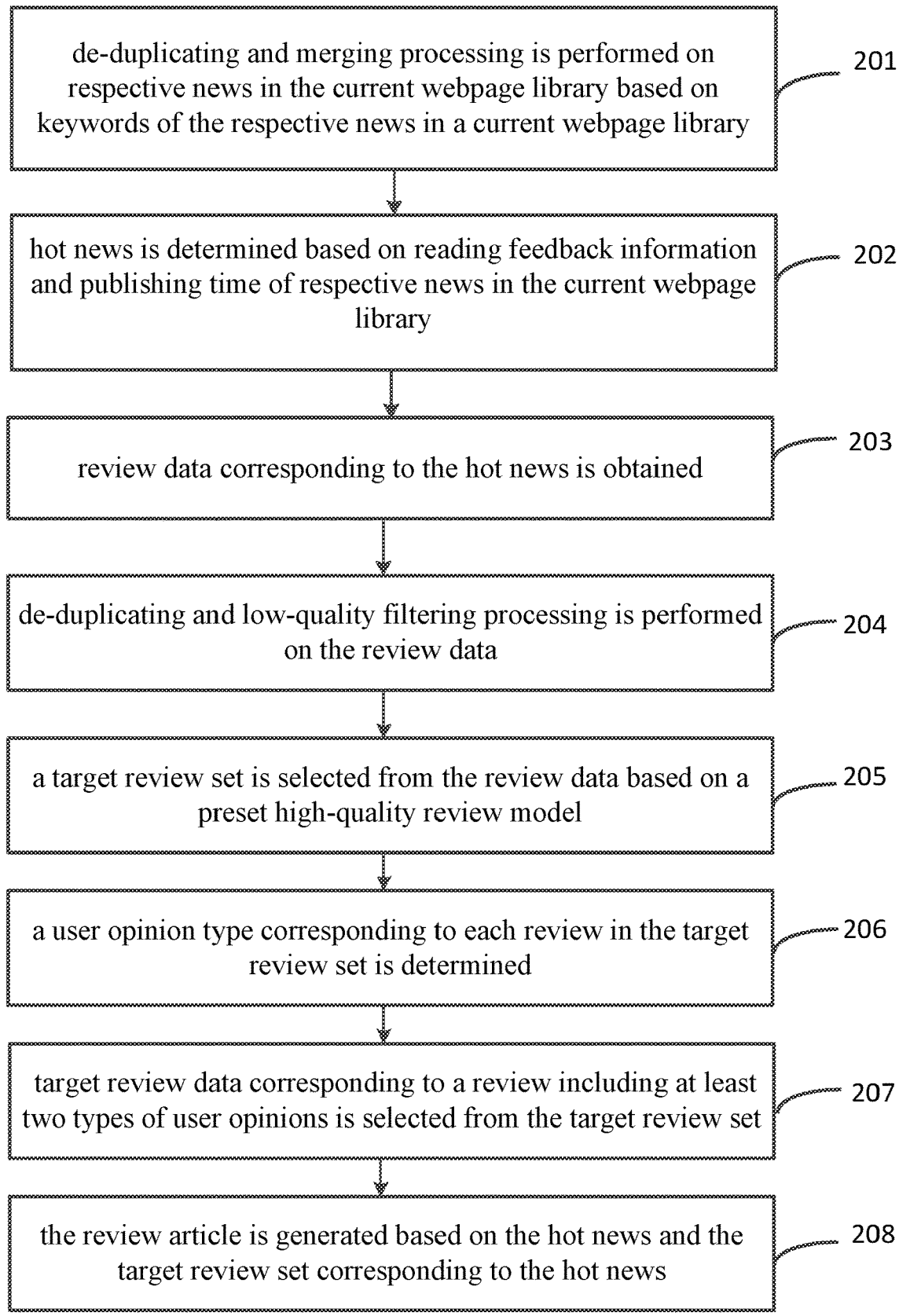
FIG. 2 is a flow chart of a method for generating a review article of hot news according to another embodiment of the present disclosure.

FIG. 2 is a flow chart of a method for generating a review article of hot news according to another embodiment of the present disclosure. As illustrated in FIG. 2, the method may include the following.

At block 201, de-duplicating and merging processing is performed on respective news in the current webpage library based on keywords of the respective news in a current webpage library.

At block 202, hot news is determined based on reading feedback information and publishing time of respective news in the current webpage library.

At block 203, review data corresponding to the hot news is obtained.

In detail, words with the highest TF-IDF can be extracted from the title and the main body of respective news in the current webpage library as the keywords of the hot news, and then the news with the same keywords can be merged into the same news. The review data of the merged news may include review data corresponding to respective news before merging.

For example, it is assumed that news 1 is: Shunkai Yan, an artist in Hubei, passed away today, who starred in "The True Story of Ah Q", news 2 is: Shunkai Yan, a famous artist, passed away, who starred in a film "The True Story of Ah Q", the news 1 corresponds to 32 reviews, and the news 2 corresponds to 7158 reviews. According to TF-IDF, it can be determined that keywords with the biggest weights in both news 1 and news 2 are: Shunkai Yan, passed away and The True Story of Ah Q, and then the news 1 and news 2 can be merged into the same news, and the merged news corresponds to 7190 (32+7158=7190) reviews.

It should be noted that, there may be low-quality news (such as click bait news, reviews without pictures, etc.) in the current webpage library. In embodiments of the present disclosure, the low-quality news can be deleted to improve the quality of the news in the current webpage library.

In addition, for the implementation process and principle of foregoing blocks 202-203, reference may be made to detailed descriptions of foregoing embodiments, and details are not described herein again.

At block 204, de-duplicating and low-quality filtering processing is performed on the review data.

It can be understood that, in the review data corresponding to the same hot news, there may be reviews with the same or similar opinions. In embodiments of the present disclosure, de-duplicating processing may be performed on the obtained review data.

In an implementation, a message-digest algorithm 5 (MD5) value can be generated for the remaining part of each review in the review data after removing stop words (such as "!", "#", "$", etc.), and then reviews with the same MD5 values can be determined as the same or similar reviews, thus the obtained review data can be de-duplicated.

In addition, the review data may include low-quality review data such as advertisements, water army, pornography, reactionary or irrelevant reviews. In embodiments of the present disclosure, low-quality filtering processing may be performed on the review data.

In detail, feature recognition may be performed on the review data using a low-quality recognition model, and low-quality reviews recognized are removed, so as to achieve low-quality filtering processing on the review data.

The low-quality recognition model may be a random forest regression model, or other types of models, which is not limited herein. The features may include the length of the review, the number of real words, the number of phone numbers, the number of ad words, and the like.

At block 205, a target review set is selected from the review data based on a preset high-quality review model.

At block 206, a user opinion type corresponding to each review in the target review set is determined.

At block 207, target review data corresponding to a review including at least two types of user opinions is selected from the target review set.

At block 208, the review article is generated based on the hot news and the target review set corresponding to the hot news.

The user opinion type may be classified based on emotion, such as a positive opinion on the hot news or a negative opinion on the hot news. Alternatively, the user opinion type may also be classified based on other factors, which is not limited herein.

In detail, after the user opinion type corresponding to each review in the target review set is determined, the target review data corresponding to the review including at least two types of user opinions can be selected from the target review set, and the review article can be generated based on the hot news and the selected target review data.

With the method for method for generating a review article of hot news according to embodiments of the present disclosure, de-duplicating and merging processing is performed on the respective news in the current webpage library based on keywords of the respective news in the current webpage library, and then the hot news is determined based on the reading feedback information and the publishing time of respective news in a current webpage library, review data corresponding to the hot news is obtained, after de-duplicating and low-quality filtering processing is performed on the review data, the target review set is selected from the review data based on the preset high-quality review model, user opinion type corresponding to each review in the target review set is determined, and target review data corresponding to the review including at least two types of user opinions from the target review set is selected, the review article is generated based on the hot news and the target review set corresponding to the hot news. Thus, the review article of the hot news can be automatically generated based on the webpage library, the cost of generating articles is reduced, the speed and timeliness of generating articles is improved, and by performing de-duplicating and merging processing on respective news and the review data corresponding to the news in the current webpage library, the quality of the review articles is improved, and user experience is improved.

Figure 3:
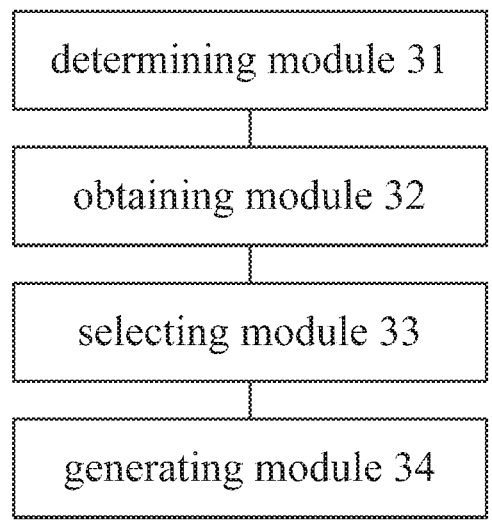
FIG. 3 is a block diagram of a device for generating a review article of hot news according to an embodiment of the present disclosure.

FIG. 3 is a block diagram of a device for generating a review article of hot news according to an embodiment of the present disclosure. As illustrated in FIG. 3, the device includes a determining module 31, an obtaining module 32, a selecting module 33 and a generating module 34.

The determining module 31 is configured to determine hot news based on reading feedback information and publishing time of respective news in a current webpage library.

The obtaining module 32 is configured to obtain review data corresponding to the hot news.

The selecting module 33 is configured to select a target review set from the review data based on a preset high-quality review model.

The generating module 34 is configured to generate the review article based on the hot news and the target review set corresponding to the hot news.

In detail, the device for generating a review article of hot news according to an embodiment of the present disclosure can perform the method for generating a review article of hot news according to an embodiment of the present disclosure. The device can be configured in any terminal device to generate the review article of hot news.

In a possible implementation of embodiments of the present disclosure, the obtaining module 32 is configured to obtain the review data corresponding to the hot news based on an address of the hot news, or obtain review data of other news whose matching degrees with the keywords satisfy a threshold, based on the keywords of the hot news.

In another possible implementation of embodiments of the present disclosure, the generating module 34 is configured to determine a user opinion type corresponding to each review in the target review set, select target review data corresponding to a review including at least two types of user opinions from the target review set, and generate the review article based on the hot news and the selected target review data.

Furthermore, the generating module 34 is further configured to select data from the hot news and the selected target review data based on a preset review article model, to construct the review article.

It should be noted that, explanation and description in embodiments of the method for generating a review article of hot news is are also suitable for the device for generating a review article of hot news of this embodiment, which are not described in detail here.

With the device for generating a review article of hot news according to embodiments of the present disclosure, hot news is determined based on reading feedback information and publishing time of respective news in a current webpage library, after review data corresponding to the hot news is obtained, a target review set is selected from the review data based on a preset high-quality review model, and then the review article is generated based on the hot news and the target review set corresponding to the hot news. Thus, the review article of the hot news can be automatically generated based on the webpage library, the cost of generating articles is reduced, the speed and timeliness of generating articles is improved, and user experience is improved.

Figure 4:
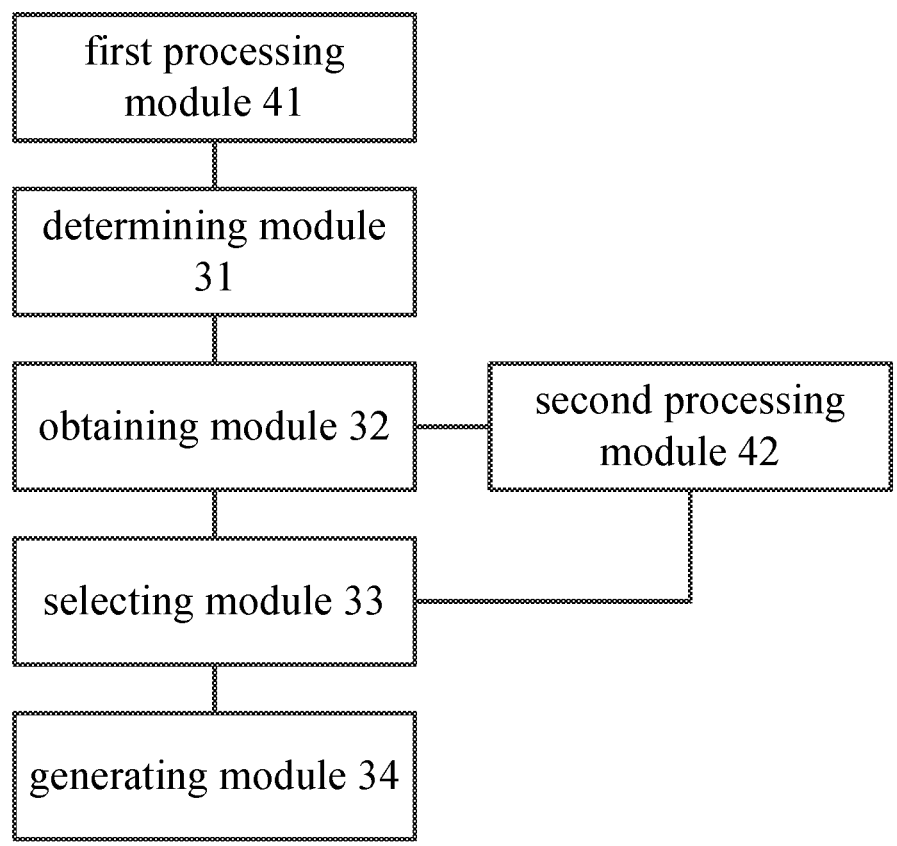
FIG. 4 is a block diagram of a device for generating a review article of hot news according to another embodiment of the present disclosure.

FIG. 4 is a block diagram of a device for generating a review article of hot news according to another embodiment of the present disclosure. As illustrated in FIG. 4, and on the basis of FIG. 3, the device further includes a first processing module 41 and a second processing module 42.

The first processing module 41 is configured to perform de-duplicating and merging processing on the respective news in the current webpage library based on keywords of the respective news in the current webpage library.

The second processing module 42 is configured to perform de-duplicating and low-quality filtering processing on the review data.

It should be noted that, explanation and description in embodiments of the method for generating a review article of hot news is are also suitable for the device for generating a review article of hot news of this embodiment, which are not described in detail here.

With the device for method for generating a review article of hot news according to embodiments of the present disclosure, de-duplicating and merging processing is performed on the respective news in the current webpage library based on keywords of the respective news in the current webpage library, and then the hot news is determined based on the reading feedback information and the publishing time of respective news in a current webpage library, review data corresponding to the hot news is obtained, after de-duplicating and low-quality filtering processing is performed on the review data, the target review set is selected from the review data based on the preset high-quality review model, user opinion type corresponding to each review in the target review set is determined, and target review data corresponding to the review including at least two types of user opinions from the target review set is selected, the review article is generated based on the hot news and the target review set corresponding to the hot news. Thus, the review article of the hot news can be automatically generated based on the webpage library, the cost of generating articles is reduced, the speed and timeliness of generating articles is improved, and by performing de-duplicating and merging processing on respective news and the review data corresponding to the news in the current webpage library, the quality of the review articles is improved, and user experience is improved.

Embodiments of the present disclosure further provide a terminal device. The terminal device includes a memory, a processor and computer programs stored in the memory and executable by the processor. The processor is configured to execute the computer programs to perform the method for generating a review article of hot news according to embodiments of the present disclosure is performed.

Embodiments of the present disclosure further provide a computer readable storage medium configured to store computer programs. When the programs are executed by a processor, the method for generating a review article of hot news according to embodiments of the present disclosure is performed.

Embodiments of the present disclosure further provide a computer program product stored with instructions thereon. When the instructions are executed by a processor, the method for generating a review article of hot news according to embodiments of the present disclosure is performed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not construed as indicating or implying relative importance or significance. Furthermore, in the description of the present disclosure, unless specified otherwise, "a plurality of" means two or more than two, such as two or three.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The above mentioned storage medium may be a read only memory, a magnetic disk or an optical disk, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for generating a review article of hot news, comprising:
   determining hot news based on reading feedback information and publishing time of respective news in a current webpage library;
   obtaining review data corresponding to the hot news;
   selecting a target review set from the review data based on a preset high-quality review model, the preset high-quality review model including a Bayesian polynomial model; and
   generating the review article based on the hot news and the target review set corresponding to the hot news,
   wherein obtaining the review data corresponding to the hot news comprises:
   obtaining the review data corresponding to the hot news based on an address of the hot news; or
   obtaining review data of other news whose matching degrees with the keywords satisfy a threshold, based on the keywords of the hot news.

2. The method according to claim 1, wherein before determining the hot news based on the reading feedback information and the publishing time of respective news in the current webpage library, the method further comprises:
   performing de-duplicating and merging processing on the respective news in the current webpage library based on keywords of the respective news in the current webpage library.

3. The method according to claim 1, wherein before selecting the target review set from the review data based on the preset high-quality review model, the method further comprises:
   performing de-duplicating and low-quality filtering processing on the review data.

4. The method according to claim 1, wherein generating the review article based on the hot news and the target review set corresponding to the hot news comprises:
   determining a user opinion type corresponding to each review in the target review set;
   selecting target review data corresponding to a review comprising at least two types of user opinions from the target review set; and
   generating the review article based on the hot news and the selected target review data.

5. The method according to claim 4, wherein generating the review article comprises:
   selecting data from the hot news and the selected target review data based on a preset review article model, to construct the review article.

6. The method according to claim 1, wherein the reading feedback information comprises one or more of the number of clicks, and the number of reviews;
   when the reading feedback information comprises the number of clicks, determining the hot news based on the reading feedback information and the publishing time of the respective news in the current webpage library comprises:
   presetting a number threshold of the number of clicks and a time threshold of the publishing time; and
   determining news whose number of click is greater than the preset number threshold and publishing time is after the preset time threshold as the hot news;
   when the reading feedback information comprises the number of reviews, determining the hot news based on the reading feedback information and the publishing time of the respective news in the current webpage library comprises:
   presetting a number threshold of the number of reviews and a time threshold of the publishing time; and
   determining news whose number of reviews is greater than the preset number threshold and publishing time is after the preset time threshold as the hot news.

7. A terminal device, comprising:
   a memory;
   a processor; and
   computer programs stored in the memory and executable by the processor,
   wherein the processor is configured to execute the computer programs, so as to:
   determine hot news based on reading feedback information and publishing time of respective news in a current webpage library;
   obtain review data corresponding to the hot news;
   select a target review set from the review data based on a preset high-quality review model, the preset high-quality review model including a Bayesian polynomial model; and
   generate the review article based on the hot news and the target review set corresponding to the hot news,
   wherein the processor is configured to obtain the review data corresponding to the hot news by acts of:
   obtaining the review data corresponding to the hot news based on an address of the hot news; or
   obtaining review data of other news whose matching degrees with the keywords satisfy a threshold, based on the keywords of the hot news.

8. The terminal device according to claim 7, wherein the processor is further configured to:
   perform de-duplicating and merging processing on the respective news in the current webpage library based on keywords of the respective news in the current webpage library, before determining the hot news based on reading feedback information and publishing time of respective news in a current webpage library.

9. The terminal device according to claim 7, wherein the processor is further configured to:
   perform de-duplicating and low-quality filtering processing on the review data, before selecting the target review set from the review data based on the preset high-quality review model.

10. The terminal device according to claim 7, wherein the processor is configured to generate the review article based on the hot news and the target review set corresponding to the hot news by acts of:

determining a user opinion type corresponding to each review in the target review set;

selecting target review data corresponding to a review comprising at least two types of user opinions from the target review set; and generating the review article based on the hot news and the selected target review data.

11. The terminal device according to claim 10, wherein the processor is configured to generate the review article by act of:

selecting data from the hot news and the selected target review data based on a preset review article model, to construct the review article.

12. The terminal device according to claim 7, wherein the reading feedback information comprises one or more of the number of clicks, and the number of reviews;

when the reading feedback information comprises the number of clicks, the processor is configured to determine the hot news based on the reading feedback information and the publishing time of the respective news in the current webpage library by acts of:

presetting a number threshold of the number of clicks and a time threshold of the publishing time; and determining news whose number of click is greater than the preset number threshold and publishing time is after the preset time threshold as the hot news;

when the reading feedback information comprises the number of reviews, the processor is further configured to determine the hot news based on the reading feedback information and the publishing time of the respective news in the current webpage library by acts of:

presetting a number threshold of the number of reviews and a time threshold of the publishing time; and determining news whose number of reviews is greater than the preset number threshold and publishing time is after the preset time threshold as the hot news.

13. A non-transitory computer readable storage medium, stored with computer programs thereon that, when executed by a processor, cause a method for generating a review article of hot news to be performed, the method comprising:

determining hot news based on reading feedback information and publishing time of respective news in a current webpage library;

obtaining review data corresponding to the hot news;

selecting a target review set from the review data based on a preset high-quality review model, the preset high-quality review model including a Bayesian polynomial model; and generating the review article based on the hot news and the target review set corresponding to the hot news, wherein obtaining the review data corresponding to the hot news comprises:

obtaining the review data corresponding to the hot news based on an address of the hot news; or obtaining review data of other news whose matching degrees with the keywords satisfy a threshold, based on the keywords of the hot news.

14. The non-transitory computer readable storage medium according to claim 13, wherein before determining the hot news based on the reading feedback information and the publishing time of respective news in the current webpage library, the method further comprises:

performing de-duplicating and merging processing on the respective news in the current webpage library based on keywords of the respective news in the current webpage library.

15. The non-transitory computer readable storage medium according to claim 13, wherein before selecting the target review set from the review data based on the preset high-quality review model, the method further comprises:

performing de-duplicating and low-quality filtering processing on the review data.

16. The non-transitory computer readable storage medium according to claim 13, wherein generating the review article based on the hot news and the target review set corresponding to the hot news comprises:

determining a user opinion type corresponding to each review in the target review set;

selecting target review data corresponding to a review comprising at least two types of user opinions from the target review set; and generating the review article based on the hot news and the selected target review data.

17. The non-transitory computer readable storage medium according to claim 16, wherein generating the review article comprises:

selecting data from the hot news and the selected target review data based on a preset review article model, to construct the review article.

\* \* \* \* \*